United States Patent
Jungwirth

(10) Patent No.: US 10,415,791 B2
(45) Date of Patent: Sep. 17, 2019

(54) REMOTE SOURCE LIGHT-GUIDING LIGHT ASSEMBLY

(71) Applicant: THE BOEING COMPANY, Chicago, IL (US)

(72) Inventor: Douglas R. Jungwirth, Porter Ranch, CA (US)

(73) Assignee: The Boeing Company, Chicago, IL (US)

(*) Notice: Subject to any disclaimer, the term of this patent is extended or adjusted under 35 U.S.C. 154(b) by 817 days.

(21) Appl. No.: 14/468,871

(22) Filed: Aug. 26, 2014

(65) Prior Publication Data

US 2016/0062027 A1 Mar. 3, 2016

(51) Int. Cl.
| | | |
|---|---|---|
| F21S 8/00 | (2006.01) | |
| F21V 7/00 | (2006.01) | |
| F21V 8/00 | (2006.01) | |
| F21V 7/06 | (2006.01) | |

(52) U.S. Cl.
CPC .............. *F21V 7/0091* (2013.01); *F21V 7/06* (2013.01); *G02B 6/0006* (2013.01); *G02B 6/0008* (2013.01); *G02B 6/0096* (2013.01); F21S 8/003 (2013.01); G02B 6/0065 (2013.01)

(58) Field of Classification Search
CPC .. G02B 6/0055; G02B 6/0031; G02B 6/0088; G02B 6/0046; G02B 6/0028; G02B 6/0065; G02B 6/0006; G02B 6/0008; G02B 6/0096; F21S 8/003; F21V 7/0091; F21V 7/06
USPC .......................... 362/606, 607, 609, 615, 623
See application file for complete search history.

(56) References Cited

U.S. PATENT DOCUMENTS

| | | | | |
|---|---|---|---|---|
| 2,589,569 A | * | 3/1952 | Hurst | G02B 6/32 116/DIG. 15 |
| 6,024,476 A | * | 2/2000 | Wakeman | G02B 6/0028 362/559 |
| 7,165,871 B2 | * | 1/2007 | Takeda | F21S 48/1154 362/538 |
| 7,213,958 B2 | * | 5/2007 | Ouderkirk | G02B 6/0001 362/560 |
| 8,733,957 B2 | * | 5/2014 | Takahashi | F21S 48/1145 362/244 |
| 9,106,045 B2 | * | 8/2015 | Galbraith | H01S 3/005 |
| 9,222,628 B2 | * | 12/2015 | Li | F21K 9/54 |
| 2011/0044070 A1 | * | 2/2011 | Takahashi | G02B 6/0008 362/553 |
| 2013/0039090 A1 | * | 2/2013 | Dau | F21S 8/04 362/551 |
| 2014/0226361 A1 | * | 8/2014 | Vasylyev | F21V 7/0091 362/606 |

(Continued)

*Primary Examiner* — Anh T Mai
*Assistant Examiner* — Arman B Fallahkhair
(74) *Attorney, Agent, or Firm* — Philip S. Hof; The Small Patent Law Group, LLC

(57) ABSTRACT

A light assembly may include a reflector having a reflective surface that defines an internal volume. A focal point is within the internal volume. A light source may be positioned outside of the internal volume of the reflector. The light source is configured to generate at least one light beam. A light guide may include an input end proximate to the light source and an output end proximate to the reflective surface. The light guide is configured to receive the light beam(s) at the input end and direct the light beam(s) out of the output end toward the reflective surface.

21 Claims, 3 Drawing Sheets

(56) References Cited

U.S. PATENT DOCUMENTS

2014/0233077 A1\* 8/2014 Iwamatsu ............ H04N 1/0285
                                                         358/475

\* cited by examiner

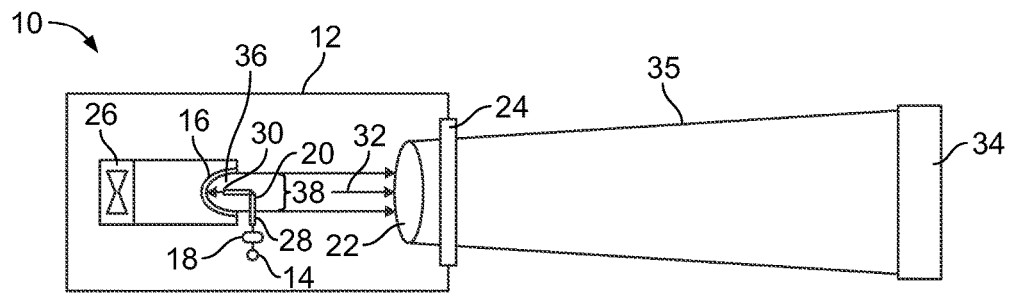
FIG. 1
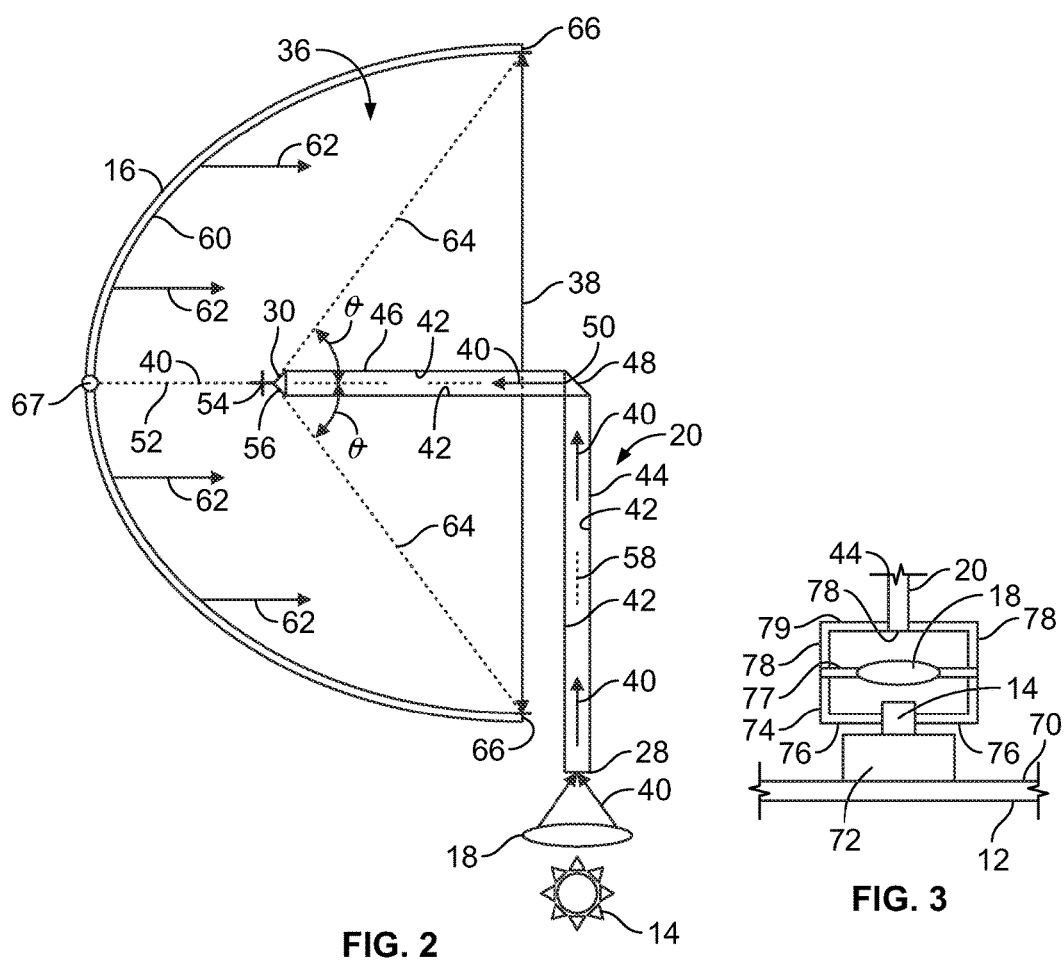
FIG. 2
FIG. 3

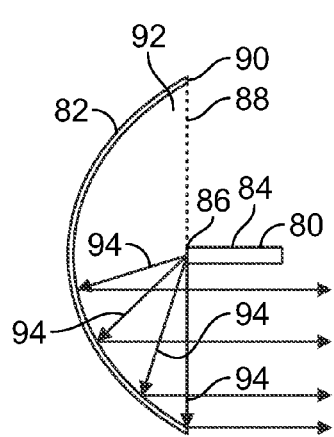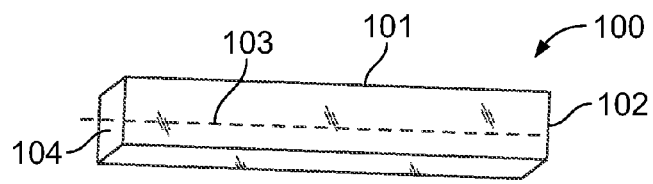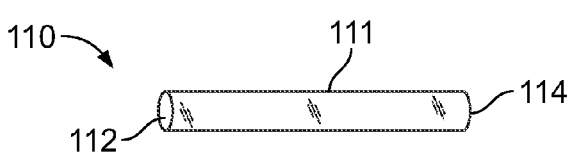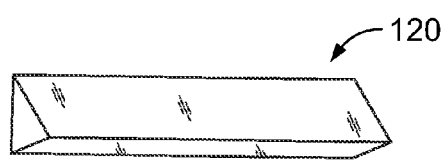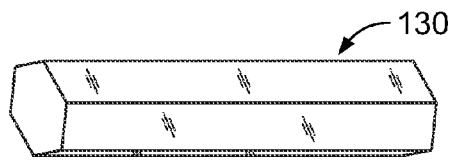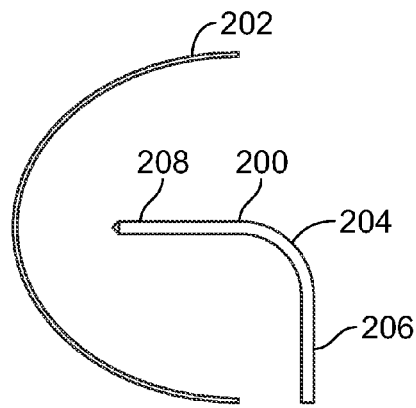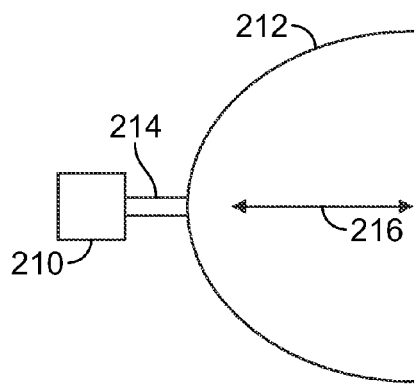
FIG. 4
FIG. 5
FIG. 6
FIG. 7
FIG. 8
FIG. 9
FIG. 10

REMOTE SOURCE LIGHT-GUIDING LIGHT ASSEMBLY

BACKGROUND OF THE DISCLOSURE

Embodiments of the present disclosure generally relate to light assemblies, such as searchlights, flashlights, vehicle headlights, and the like, and, more particularly, to remote source light-guiding light assemblies.

High-power searchlights are used in various settings to focus light energy onto a particular target. A typical searchlight includes an arc lamp that outputs light that is reflected by conic mirrors.

Known light assemblies include a light source, such as a short arc lamp. Typically, the light source is positioned within a reflective volume or light emission envelope (for example, the path through which light is emitted from the light assembly) of a parabolic reflector. One known light assembly includes a light source positioned proximate to a focal point of the reflector. During operation, because the light source is disposed within the light emission envelope, the light source blocks some of the light that reflects off the reflector. Therefore, the light emitted from the light assembly may include shadows and weak spots that are directed onto a target.

Because the light source is positioned within the light emission envelope, known light assemblies often include large reflectors in order to compensate for the resulting shadows or weak spots caused by the light source. At least a portion of the light energy that impinges on a large reflector may generate heat thereon.

In order to provide electrical energy to the light source, wiring typically connects to the light source. The light source may also be mounted to the reflector through a frame. The frame and at least a portion of the wiring may be disposed within the light emission envelope, thereby producing additional shadows or weak spots within a light pattern projected on a target.

Additionally, at least some of the light generated by the light source may escape past the reflector. For example, the reflector may not be capable of reflecting all of the light that is generated by the light source. As such, the efficiency of the light assembly decreases.

SUMMARY OF THE DISCLOSURE

Certain embodiments of the present disclosure provide a light assembly that may include a reflector having a reflective surface that defines an internal volume. A focal point is within the internal volume of the reflector. A light source may be positioned outside of the internal volume of the reflector. For example, the light source may be outside a light emission envelope (which may include the internal volume) of the light assembly. The light source is configured to generate at least one light beam. A light guide may include an input end proximate to the light source and an output end proximate to the reflective surface. The light guide may be configured to receive the light beam(s) at the input end and direct the light beam(s) out of the output end toward the reflective surface. The output end may include a tapered tip and/or a light diffusing surface.

In at least one embodiment, the output end of the light guide is positioned at or proximate to the focal point. At least one actuator may be configured to move the output end of the light guide relative to the focal point. For example, the actuator(s) may be configured to move the reflector in relation to the light guide so that the output end selectively moves toward and away from the focal point.

In at least one embodiment, the light guide may be formed of an optically-transparent material. The light guide may be configured to direct the light beam(s) from the input end to the output end through total internal reflection. In at least one embodiment, the light guide includes a beam input segment integrally connected to a beam output segment through a transition bend. The beam input segment may be perpendicular to the beam output segment. The beam input segment may be coaxial with a central longitudinal axis of the reflector. The transition bend may include a mirror that reflects the one or more light beams toward the output end.

Certain embodiments of the present disclosure provide a method of forming a light assembly that may include providing a reflector having a reflective surface that defines an internal volume, wherein a focal point is within the internal volume, securing a light source outside of the internal volume of the reflector, optically coupling the light source to an input end of a light guide that extends into the internal volume of the reflector, and directing an output end of the light guide toward the reflective surface of the reflector.

BRIEF DESCRIPTION OF THE DRAWINGS

FIG. 1 illustrates a schematic diagram of a light assembly, according to an embodiment of the present disclosure.

FIG. 2 illustrates a schematic diagram of a light guide in relation to a reflector, according to an embodiment of the present disclosure.

FIG. 3 illustrates a schematic diagram of a light source secured to an input focusing lens and a light guide, according to an embodiment of the present disclosure.

FIG. 4 illustrates a schematic diagram of a light guide in relation to a reflector, according to an embodiment of the present disclosure.

FIG. 5 illustrates a perspective lateral view of a portion of a light guide, according to an embodiment of the present disclosure.

FIG. 6 illustrates a perspective lateral view of a portion of a light guide, according to an embodiment of the present disclosure.

FIG. 7 illustrates a perspective lateral view of a portion of a light guide, according to an embodiment of the present disclosure.

FIG. 8 illustrates a perspective lateral view of a portion of a light guide, according to an embodiment of the present disclosure.

FIG. 9 illustrates a schematic diagram of a light guide in relation to a reflector, according to an embodiment of the present disclosure.

FIG. 10 illustrates a schematic of an actuator operatively connected to a reflector, according to an embodiment of the present disclosure.

DETAILED DESCRIPTION OF THE DISCLOSURE

Figure 11:
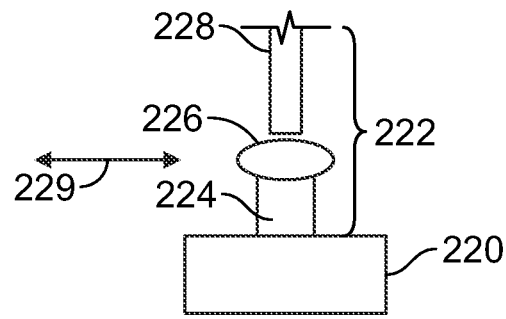
FIG. 11 illustrates a schematic of an actuator operatively connected to a light generator, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a light assembly that may include a light source that is positioned outside of an internal volume, such as a reflective and/or collimating volume, of a reflector. The internal volume is the volume of space defined between or bounded by the internal reflective surface of the reflector. The light source may be positioned outside of the reflector and may emit a light beam into a light guide that directs the light beam towards a focal point of the reflector. The light guide may be formed of a clear, transparent material, such as polished glass, for example. Because the light source is positioned outside of the internal volume and a light emission envelope of the light assembly, the light source does not produce any shadows or weak spots in the emitted light beam, such as a collimated light beam that is directed onto a target. The light emission envelope may be the path over or through which light energy reflected off the reflector may be emitted through and from the light assembly.

FIG. 1 illustrates a schematic diagram of a light assembly 10, according to an embodiment of the present disclosure. The light assembly 10 may include a housing 12 that securely retains a light source 14, a reflector 16, an input focusing lens 18, a light guide 20, an output focusing lens 22, and a transparent outlet or aperture 24. The light guide 20 may be or include a light pipe, light wave guide, light-directing sleeve, tube, or the like.

The light source 14, the input focusing lens 18, and the light guide 20 may be securely positioned within the housing 12. For example, the light source 14 may be securely fixed to an internal wall of the housing 12, such as through one or more fasteners, adhesives, and the like. The input focusing lens 18 may be aligned with and secured to the light source 14 and the light guide 20 through one or more brackets, tubes, sleeves, or other such securing structures.

The light source 14 may be or include an arc lamp that is configured to generate white light, for example. For example, the light source 14 may be a Xenon short-arc lamp. Alternatively, the light source 14 may be various other types of light sources, such as a laser-emitting device, an incandescent lamp, a fluorescent light bulb, one or more light emitting diodes (LEDs), and/or the like. The reflector 16 may be a conic or parabolic mirror that is configured to direct light into the output focusing lens 22. The input focusing lens 18 may be positioned to focus the light emitted from the light source 14 to an input end 28 of the light guide 20.

The light assembly 10 may also include a fan 26 configured to circulate air flow through the light assembly 10 to dissipate any heat generated by the light source 14 and/or the reflector 16. The housing 12 may also include one or more vents that allow air to pass into and out of the housing. Alternatively, the light assembly 10 may not include the fan 26. For example, instead of the fan 26, the light assembly 10 may include vents that are configured to allow air to pass therethrough to cool the internal components of the light assembly 10.

In operation, the light source 14 is activated to generate and emit a light beam into the input focusing lens 18. The input focusing lens 18 receives the light beam and focuses the light beam into an input end 28 of the light guide 20. The light guide 20 channels the light beam therethrough and directs the light beam to an output end 30, which may be at or proximate to (for example, within 0.2 inches or less) a focal point of the reflector 16. The light guide 20 directs, channels, projects, or the like one or more light beams received from the light source 14 onto an internal reflective surface of the reflector 16. The light beam that is emitted from the output end 30 of the reflector 16 reflects off the internal reflective surface of the reflector 16 as a collimated light beam 32 that passes through the output focusing lens 22 and out of the aperture 24 towards a target 34. Alternatively, the light assembly 10 may not include the output focusing lens 22.

The closer the output end 30 of the light guide 20 is to the focal point of the reflector 16, the finer the focus of the light beam(s) that is reflected off the reflector 16 and through the aperture 24. If the output end 30 is moved away from the focal point and towards the reflector 16, the divergence of the output beam decreases, until it crosses over and then increases. Similarly, if the output end 30 is moved past the focal point and towards the reflector 16, the divergence off the reflector 16 may increase.

The output focusing lens 22 may be moved within the housing 12 to adjust the width of an output light beam 35. For example, if the output focusing lens 22 may be moved within the housing 12 to adjust the width and divergence of an output light beam 35, the output light beam 35 may be adjusted.

Alternatively, the light assembly 10 may include more or less focusing lenses than shown. For example, the light assembly 10 may not include the input focusing lens 18. Instead, the light assembly 10 may focus and direct a light beam into the input end 28 of the light guide 20.

As shown, the light source 14 is positioned outside an internal volume 36 of the reflector 16. The internal volume 36 forms part of a light emission envelope 38 that defines a path over and through which light energy may be reflected off the reflector and emitted through and out of the light assembly 10. Accordingly, the light source 14 is positioned outside of the light emission envelope 38 of the reflector 16. The light emission envelope 38 includes a total space through which light may be reflected off the reflector 16. For example, the light emission envelope 38 may include a total or maximum diameter of a collimated light beam that may be generated by the light assembly 10. Because the light source 14 is positioned outside of the light emission envelope 38, the light source 14 does not produce shadows or weak spots in the collimated light beam 32 that would be projected onto the target 34.

FIG. 2 illustrates a schematic diagram of the light guide 20 in relation to the reflector 16, according to an embodiment of the present disclosure. As shown, the reflector 16 may have a parabolic shape. The light guide 20 may be formed of a solid piece of an optically-transparent material, such as glass, clear plastic, or the like. An outer surface of the optically-transparent material may be polished and uncoated. The outer surface may be polished through various known methods in order to eliminate, minimize, or otherwise reduce any bumps, divots, protuberances, or other such imperfections. As such, as a focused light beam 40 passes into the input end 28 of the light guide 20, the light beam 40 is unable to propagate past internal reflecting surfaces 42, but instead reflects back onto itself through a phenomenon of total internal reflection. As the light beam 40 passes through the light guide 20 and strikes the internal reflecting surfaces 42, the light beam 40 is unable to pass through the internal reflecting surfaces 42 as the refractive index is lower on the outside surface of the internal reflecting surfaces 42 as compared to the inner surface. Consequently, the light beam 40 is entirely reflected and propagated within the light guide 20.

As shown, the light guide 20 may include a beam input segment 44 integrally connected to a beam output segment 46 through a transition bend 48. The transition bend 48 may be a right angle bend, such that the beam input segment 44 is perpendicular to the beam output segment 46. A mirror 50 may be disposed within the transition bend 48. The mirror 50 may be oriented at a 45 degree angle (with respect to a central longitudinal axis 58 of the beam input segment 44), for example. Alternatively, the light guide 20 may not include the mirror 50. Instead, the angled surface of the transition bend 48 may reflect the light beam 40 into the beam input segment 44.

The beam output segment 46 may be axially aligned about and parallel with a central longitudinal axis 52 of the reflector 16. Therefore, the beam input segment 44 may be perpendicular to the central longitudinal axis 52 of the reflector 16.

The output end 30 of the light guide 20 may be positioned at or proximate to a focal point 54 of the reflector 16, which may be along the central longitudinal axis 52. Light that passes out of the output end 30 is radiated or directed into the focal point 54.

The output end 30 may include a tapered tip 56, such as in the form of a pyramid. The tapered tip 56 focuses the emitted light that passes out of the output end 30. Alternatively, the tapered tip 56 may have the same axial cross section as the rest of the beam output segment 46. Also, alternatively, the output end 30 may include one or more light diffusing surfaces configured to diffuse light emitted therefrom. For example, the output end 30 may include one or more lenses, etched, ground, or roughened surfaces (to diffuse emitted light, for example), colored filters, a holographic surface, an opal glass surface, and/or the like. The output end 30 may be sized, shaped, coated, formed, and/or the like to scatter light to provide a more diffuse light beam that is directed toward the reflector 16.

As shown in FIG. 2, the light source 14 and the input focusing lens 18 are positioned outside of the light emission envelope 38, which includes the internal volume 36 of the reflector 16. The light emission envelope 38 may have a width or diameter that spans the internal diameter of the reflector 16. The light source 14 is remotely located from the reflector 16. The light source 14 may be positioned any distance away from the reflector 16. In at least one embodiment, the light source 14 may be outside of the housing of the light assembly.

In operation, the light source 14 generates the light beam 40, which is focused into the input end 28 of the light guide 20. Through the phenomenon of total internal reflection, as described above, the light beam 40 is directed along the beam input segment 44 in a direction toward the transition bend 48 that is parallel to the central longitudinal axis 58 of the beam input segment 44. The light beam 40 is trapped in the light guide 20 and propagates therein. The light beam 40 within the light guide 20 is trapped by total internal reflection. As the light beam 40 enters the transition bend 48, the light beam 40 reflects off the mirror 50 into the beam output segment 46 in a direction toward the output end 30 that is parallel to the central longitudinal axis 52 of the reflector 16 (which may be coaxial with a central longitudinal axis of the beam output segment 46). The light beam 40 is emitted or projected from the output end 30 at or proximate to the focal point 54 of the reflector 16 and impinges upon an internal reflective surface 60 of the reflector 16, which reflects the light beam 40 as a collimated light beam 62 that may be parallel with the central longitudinal axis 52 of the reflector 16.

The tapered tip 56 may be shaped to emit light in directions toward the reflector 16. As shown, the angle θ of the outer surface of the tapered tip 56 with respect to the central longitudinal axis 52 may be such as to prevent light from escaping past the reflector 16. For example, tangent lines 64 extending from the receding surfaces of the tapered tip 56 at the angles θ intersect with the internal reflective surface 60 of the reflector 16. In at least one embodiment, the tangent lines 64 intersect with the internal reflective surface 60 proximate to a distal edge rim 66 of the reflector 16. The tapered tip 56 may be shaped such that the tangent lines 64 intersect with the distal edge rim 66, or at a depth within the internal volume 36 that is shallower (that is, closer toward a central point 67 of the reflector 16) than the distal edge rim 66. Light emitted from the tapered tip 56 reflects off the internal reflective surface 60, instead of escaping past the reflector 16. Therefore, the light assembly provides an efficient light emitting device in which all of the light generated by the light source 14 may be reflected off the reflector 16.

The output end 30, including the tapered tip 56, may be sized to provide as small an emitting output or surface as desired. The tapered tip 56 may shrink the diameter of the light beam 40 as it passes out of the output end 30.

Because the light guide 20 is formed of a transparent material, the light guide 20 may not block or absorb the collimated light beam 62. For example, because the collimated light beam 62 is parallel with the central longitudinal axis 52, the collimated light beam 62 may be perpendicular to the beam input segment 44. The collimated light beam 62 is not totally internally reflected by, but simply transmitted through, the beam input segment 44. Accordingly, the collimated light beam 62 does not reflect within the beam input segment 44, but, instead, passes directly therethrough with no attenuation.

A certain portion of the collimated light beam 62 that is coaxial with the central longitudinal axis 52 may pass back into the output end 30 of the light guide 20. The reflected portion of the collimated light beam 62 that enters into the output end 30 may be absorbed by the light beam 40 within the light guide 20, which is then projected toward the reflector 16. Further, the mirror 50 may block a portion of the collimated light beam 62. However, the mirror 50 may be much smaller than the light source 14, for example, and the resulting shadow or weak spot in the collimated light beam 62 may be negligible (in relation to a shadow caused by a light source within the internal volume 36).

As described above, a method of forming the light assembly 10 may include optically coupling the remote light source 14 to the input end 28 of the light guide 20, which may extend into the internal volume 36 of the reflector 16. The output end 30 of the light guide 20 is directed toward the reflector 16. The output end 30 may be positioned at or proximate to the focal point 54 of the reflector 16. Embodiments of the present disclosure provide a light assembly in which the light source 14 may be remotely located from the reflector 16, and one or more light beams(s) generated by the light source 14 are guided to the reflective surface 60 of the reflector 16 through the light guide 20.

FIG. 3 illustrates a schematic diagram of the light source 14 secured to the input focusing lens 18 and the light guide 20, according to an embodiment of the present disclosure. Only a portion of the light guide 20 is shown in FIG. 3. The light source 14 may be securely mounted to an internal wall 70 of the housing 12 through a securing member 72, such as a base, clamp, fastener(s), bracket(s), or the like. A bracket 74 may securely connect and align the light source 14 with respect to the input focusing lens 18 and the light guide 20. For example, the bracket 74 may include arms 76 that securely connect to an outer surface of the light source 14 and/or the securing member 72. The arms 76 may in turn connect to extension beams 78, which, in turn connect to arms 77 and 79 that secure to or around outer surfaces or edges of the input focusing lens 18 and the input end 28 of the light guide 20.

FIG. 3 illustrates one example of a structure that secures aligns a light generator, which may include the light source 14, the input focusing lens 18, and the light guide 20. It is to be understood that various other structures may be used to secure and align the light generator.

FIG. 4 illustrates a schematic diagram of a light guide 80 in relation to a reflector 82, according to an embodiment of the present disclosure. FIG. 4 shows only a beam output segment 84 of the light guide 80. For the sake of clarity, the remainder of the light guide 80 is not shown in FIG. 4.

An output end 86 of the light guide 80 may reside within a same plane 88 as a distal rim edge 90 of the reflector 82. The output end 86 may be a flat surface that also resides within the plane 88, or may be positioned at a shallower depth within an internal volume 92 toward the reflector 82. In this manner, light beams 94 output from the output end 86 are unable to be directed past the plane 88 away from the reflector 16.

FIG. 5 illustrates a perspective lateral view of a portion of a light guide 100, according to an embodiment of the present disclosure. The portion shown in FIG. 5 may be or include portions of beam input or output segments of any of the light guides described with respect to FIGS. 1-4. The light guide 100 may be formed of an optically-transparent material, such as glass, clear plastic, or the like, and includes a main body 101 formed of parallel reflecting surfaces between an end 102 and an end 104. As shown, the light guide 100 may be a clear rectangular member, such as a block, beam, or the like, having a square or rectangular axial cross-section. The outer surface of the main body 101 may be polished to a smooth, consistent finish that is devoid of bumps, scratches, divots, protuberances, dents, or other such imperfections. Accordingly, the light guide 100 may be configured to internally project light through total internal reflection. The polished outer surface of the main body 101 is configured to continually reflect a light beam back onto itself as the light beam propagates along a longitudinal axis 103 of the light guide 100.

FIG. 6 illustrates a perspective side view of a light guide 110, according to an embodiment of the present disclosure. The portion shown in FIG. 6 may be or include portions of beam input or output segments of any of the light guides described with respect to FIGS. 1-4. The light guide 110 may be formed of an optically-transparent material, such as glass, clear plastic, or the like, and includes a main cylindrical body 111 formed of reflecting surfaces between an end 112 and an end 114. As shown, the light guide 110 may be a clear cylindrical rod having a circular or elliptical axial cross-section. The outer surface of the main body 111 may be polished to a smooth, consistent finish that is devoid of bumps, scratches, divots, protuberances, dents, or other such imperfections. Accordingly, the light guide 110 may be configured to project light through total internal reflection.

FIG. 7 illustrates a perspective lateral view of a portion of a light guide 120, according to an embodiment of the present disclosure. The portion shown in FIG. 7 may be or include portions of beam input or output segments of any of the light guides described with respect to FIGS. 1-4. The light guide 120 is similar to the light guides described above, except that an axial cross section of the light guide 120 is triangular.

FIG. 8 illustrates a perspective lateral view of a portion of a light guide 130, according to an embodiment of the present disclosure. The portion shown in FIG. 8 may be or include portions of beam input or output segments of any of the light guides described with respect to FIGS. 1-4. The light guide 130 is similar to the light guides described above, except that an axial cross section of the light guide 130 is hexagonal. Various other polygonal shapes may be used. For example, the light guide 130 may be formed as a pentagonal, heptagonal, octagonal, etc. rod of optically-transparent material.

The cross-sectional shape of the light guide may be various shapes and sizes. For example, the light guide may be shaped to output a circular, elliptical, or various other shaped light beams.

FIG. 9 illustrates a schematic diagram of a light guide 200 in relation to a reflector 202, according to an embodiment of the present disclosure. The light guide 200 is similar to any of the light guides described above, except that the light guide 200 includes a curved transition 204 that connects a beam input segment 206 to a beam output segment 208.

FIG. 10 illustrates a schematic of an actuator 210 operatively connected to a reflector 212, according to an embodiment of the present disclosure. The actuator 210 may be a motor or a manually-actuated device (such as a moveable handle, worm screw, or the like) that connects the reflector 212 through a link 214, such as a post, column, stud, or the like. The actuator 210 is configured to selectively move the reflector 212 in longitudinal directions denoted by arrow 216. In this manner, the actuator 210 may be configured to move the reflector 212 in relation to a light guide so that an output end of the light guide is at or away from a focal point of the reflector 212.

FIG. 11 illustrates a schematic of an actuator 220 operatively connected to a light generator 222, according to an embodiment of the present disclosure. The light generator 222 may include a light source 224, an input focusing lens 226, and a light guide 228. The actuator 220 may be configured to move the light generator 222 in directions toward and away from a reflector in the directions of arrow 229. Therefore, the actuator may be configured to move the light generator 222 in relation to the reflector so that the output end (not shown in FIG. 11) of the light guide 228 is at or away from a focal point of the reflector.

Figure 12:
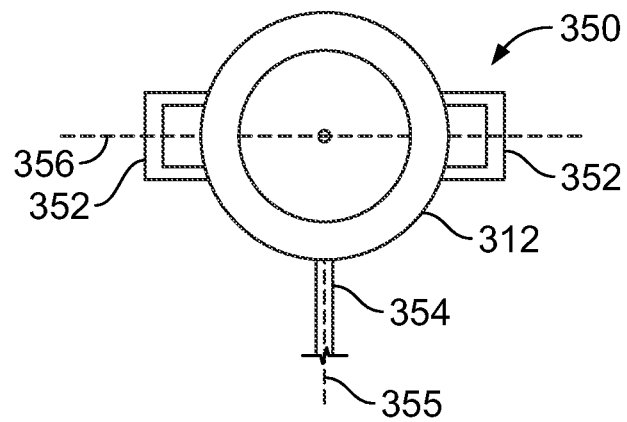
FIG. 12 illustrates a front view of a light assembly, according to an embodiment of the present disclosure.

FIG. 12 illustrates a front view of a light assembly 350, according to an embodiment of the present disclosure. The light assembly 350 may include any of the embodiments described above, and may also include handles 352 configured to be grasped by an individual. The light assembly 350 may also include a housing 312 mounted on a post 354, for example. The housing 312 may be configured to rotate about a vertical axis 355 of the post 354. Further, the housing 312 may be configured to rotate about a horizontal axis 356. As shown, the light assembly 350 may be a searchlight or spotlight.

Figure 13:
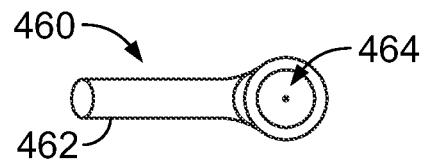
FIG. 13 illustrates a side view of a light assembly, according to an embodiment of the present disclosure.

FIG. 13 illustrates a side view of a light assembly 460, according to an embodiment of the present disclosure. The light assembly 460 may include a graspable handle 462 connected to a light emitter 464, such as any of the assemblies described above. The light assembly 460 may be a flashlight or handheld signaling light, for example.

As described above, embodiments of the present disclosure provide a light assembly that includes a light source that is outside of a light emission envelope, which includes an internal volume of a reflector. A light guide may receive one or more light beams from the light source and direct and project the light beam(s) onto an internal reflective surface of the reflector, which reflects the light beam(s) out of the light assembly and toward a target.

Embodiments of the present disclosure provide a light assembly that minimizes or otherwise reduces an amount of reflected light that is blocked by optical elements, such as a light source, wires, mounting structures, and the like. The output end of the light guide may be formed such that an outer emitting surface (through which light beam(s) are emitted) prevents light from escaping past the reflector without being reflected. The shape of the output end and/or its position with respect to the reflector may ensure that all of the light energy that passes out of the light guide is reflected by the reflector.

Embodiments of the present disclosure provide a light assembly that is configured to generate light at a remote location and guide the light onto a reflective surface of a reflector. The light source does not block the light as it is reflected off the reflector and is emitted from the light assembly. The light emitted from the light assembly may be shaped at the focal point of the reflector.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A light assembly comprising:
   a reflector having a curved reflective surface that continuously extends from a first distal edge rim of the reflector through a central point of the reflector to a second distal edge rim of the reflector, the reflective surface defining an internal volume of the reflector axially between the central point and the first and second distal edge rims, wherein a focal point of the reflective surface is within the internal volume;
   a light source positioned outside of the internal volume of the reflector, wherein the light source is configured to generate at least one light beam; and
   a light guide including an input end proximate to the light source and an output end within the internal volume of the reflector and facing toward the reflective surface, wherein the light guide is configured to receive the at least one light beam at the input end and direct the at least one light beam out of the output end toward the reflective surface, wherein the light guide extends across a light emitting opening of the reflector through which the at least one light beam is emitted after reflecting off the reflective surface, and
   wherein the output end of the light guide includes one or more light emitting surfaces, and all tangent lines extending from the one or more light emitting surfaces intersect the reflective surface of the reflector to prohibit light emitted from the output end from escaping past the reflective surface without reflecting off the reflective surface.

2. The light assembly of claim 1, wherein the light guide includes a beam input segment that is perpendicular to a beam output segment.

3. The light assembly of claim 2, wherein the beam output segment is coaxial with a central longitudinal axis of the reflector that extends through the central point of the reflector.

4. The light assembly of claim 2, wherein the transition bend includes a mirror that reflects the one or more light beams toward the output end.

5. The light assembly of claim 1, wherein the output end of the light guide is positioned at or proximate to the focal point.

6. The light assembly of claim 1, further comprising at least one actuator that is configured to move the output end of the light guide relative to the focal point.

7. The light assembly of claim 1, wherein the light source is outside a light emission envelope of the light assembly.

8. The light assembly of claim 1, wherein the light guide is formed of an optically-transparent material, wherein the light guide is configured to direct the one or more light beams from the input end to the output end through total internal reflection.

9. The light assembly of claim 1, wherein the light guide includes a beam input segment integrally connected to a beam output segment through a transition bend.

10. The light assembly of claim 1, wherein the output end includes a tapered tip that defines the one or more light emitting surfaces, wherein the light guide is configured to direct the at least one light beam out of the output end through the tapered tip toward the reflective surface.

11. The light assembly of claim 1, wherein the light emitting opening of the reflector extends across the internal volume from the first distal edge rim to the second distal edge rim, wherein a beam output segment of the light guide that defines the output end extends from outside of the internal volume through the light emitting opening of the reflector.

12. The light assembly of claim 1, wherein the reflector has a parabolic curve from the first distal edge rim to the second distal edge rim.

13. A method of forming a light assembly comprising:
providing a reflector having a curved reflective surface that continuously extends from a first distal edge rim of the reflector through a central point of the reflector to a second distal edge rim of the reflector, the reflective surface defining an internal volume of the reflector axially between the central point and the first and second distal edge rims, wherein a focal point of the reflective surface is within the internal volume;
securing a light source outside of the internal volume of the reflector;
optically coupling the light source to an input end of a light guide, the light guide extending across a light emitting opening of the reflector from the input end located outside of the internal volume to an output end of the light guide located within the internal volume, the output end of the light guide including one or more light emitting surfaces; and
directing the output end of the light guide to face toward the reflective surface of the reflector such that all tangent lines extending from the one or more light emitting surfaces at the output end intersect the reflective surface, wherein light energy emitted from the one or more light emitting surfaces at the output end of the light guide reflects off the reflective surface and exits the internal volume through the light emitting opening.

14. The method of claim 13, wherein the directing comprises positioning the output end of the light assembly at or proximate to the focal point.

15. The method of claim 13, further comprising using at least one actuator to move the output end of the light guide relative to the focal point.

16. The method of claim 13, wherein the securing comprises positioning the light source outside a light emission envelope of the light assembly.

17. The method of claim 13, further comprising forming a tapered tip at the output end, the tapered tip defining the one or more light emitting surfaces.

18. The method of claim 13, wherein a beam input segment of the light guide is perpendicular to a beam output segment.

19. A light assembly comprising:
a reflector having a curved reflective surface that defines an internal volume, the reflective surface extending from a first distal edge rim of the reflector to a second distal edge rim of the reflector, the reflector defining a light emitting opening at the first and second distal edge rims that extends across the internal volume, wherein a focal point of the reflective surface is within the internal volume;
a light source positioned outside of a light emission envelope that includes the internal volume of the reflector, wherein the light source is configured to generate at least one light beam; and
a light guide formed of an optically-transparent material and extending from outside of the internal volume through the light emitting opening of the reflector into the internal volume, the light guide including an input end that is outside of the internal volume proximate to the light source and an output end that is within the internal volume at or proximate to the focal point and facing toward the reflective surface, the output end of the light guide including one or more light emitting surfaces and all tangent lines extending from the one or more light emitting surfaces intersect the reflective surface of the reflector,
wherein the light guide is configured to receive the at least one light beam at the input end and direct the at least one light beam through the light guide through total internal reflection before emitting the at least one light beam from the one or more light emitting surfaces at the output end toward the reflective surface, wherein the at least one light beam is emitted from the reflector through the light emitting opening after reflecting off the reflective surface.

20. The light assembly of claim 19, wherein the light guide includes a beam input segment integrally connected to a beam output segment through a transition bend, wherein the beam output segment extends across the light emitting opening of the reflector and is coaxial with a central longitudinal axis of the reflector, wherein the beam input segment is outside of the internal volume and is perpendicular to the beam output segment, and wherein the transition bend includes a mirror that reflects the one or more light beams toward the output end.

21. The light assembly of claim 19, wherein the reflective surface continuously extends from the first distal edge rim through a central point of the reflector to the second distal edge rim.

* * * * *